United States Patent
King et al.

[15] 3,690,435
[45] Sept. 12, 1972

[54] ARTICLE CONVEYOR SYSTEM

[72] Inventors: John W. King, 532 Cottage Grove; John D. Sweeney, 1208 Shadow Lane, both of Green Bay, Wis. 54304

[22] Filed: April 16, 1970

[21] Appl. No.: 29,146

[52] U.S. Cl..........................................198/20, 198/78
[51] Int. Cl..............................................B65g 47/04
[58] Field of Search....198/20, 78, 94, 191, 121, 102, 198/21; 214/16 B

[56] References Cited

UNITED STATES PATENTS

| 1,737,762 | 12/1929 | Howe.......................198/21 X |
| 2,734,643 | 2/1956 | Macrae.....................198/21 X |
| 3,504,782 | 4/1970 | Slagle et al...............198/94 X |
| 3,173,557 | 3/1965 | Eliassen....................198/78 X |

FOREIGN PATENTS OR APPLICATIONS

| 914,740 | 1/1963 | Great Britain...............198/21 |

*Primary Examiner*—Edward A. Sroka
*Attorney*—Robert J. Doherty

[57] ABSTRACT

An article conveying system including an elongated endless conveyor and one or more transverse endless conveyors intersecting the elongated conveyor. The transverse conveyors are swingable in relation to the elongated endless conveyor to move the respective conveying reaches above and below one another and provide for the transfer of articles moving in one direction on the transverse conveyor to be conveyed in a second direction on the elongated conveyor.

10 Claims, 4 Drawing Figures

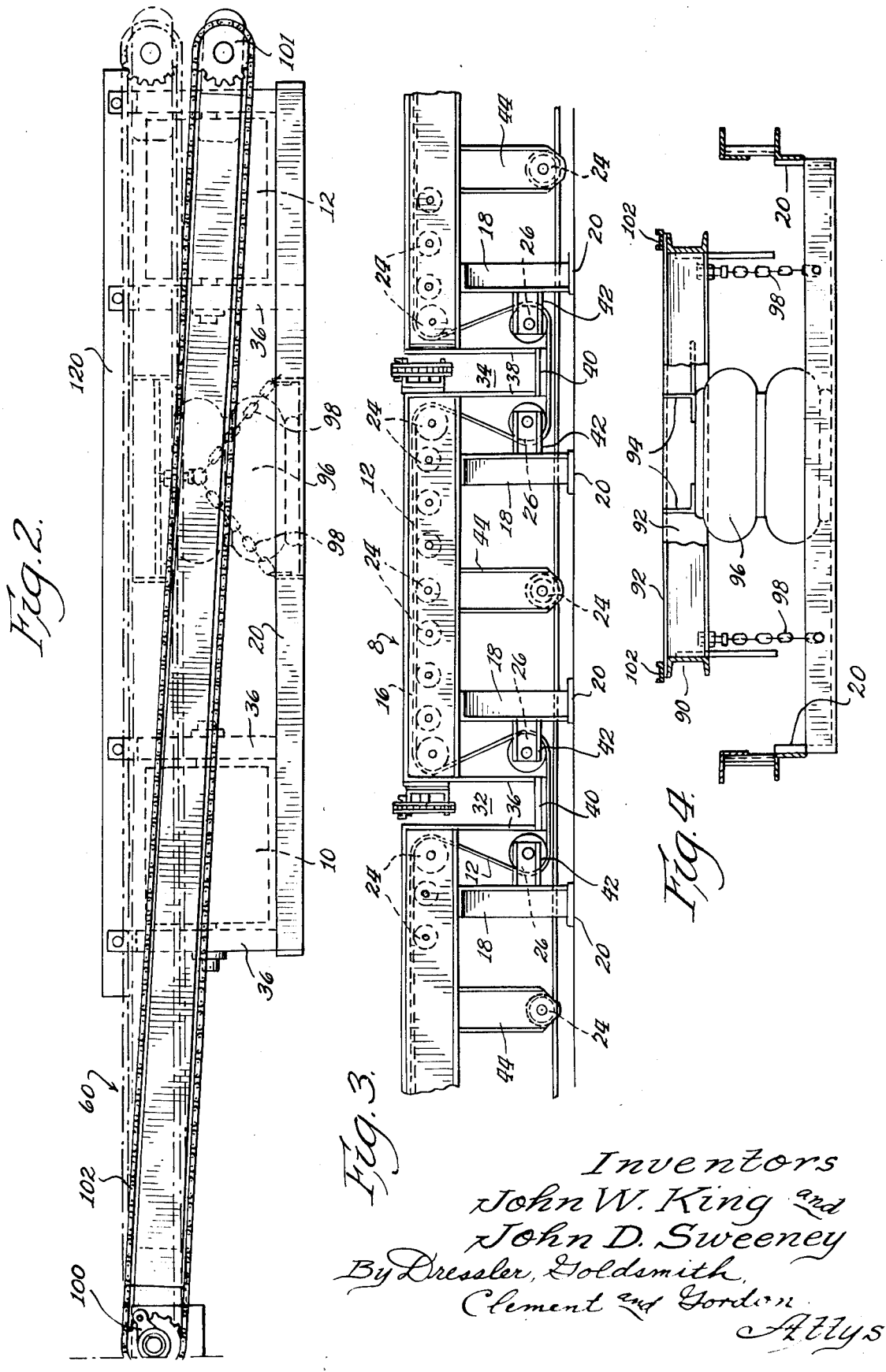

3,690,435

ARTICLE CONVEYOR SYSTEM

BACKGROUND OF THE INVENTION

The present invention relates to an article conveying system and more particularly concerns a combination of intersecting endless conveyors to form an article transfer arrangement to conveniently move articles being conveyed in one direction from a work station to be conveyed into a second direction to be moved to a second work station.

Despite many innovations and advances in the material handling and conveyor art, few improvements have been made to endless conveyors handling articles, which are transferred to side conveyors onto a main conveyor. Generally, the side conveyor moves the article close to the main endless conveyor and at the that point deposits it on a conventional transfer device made up of a series of parallel rollers. At this time an operator is required to push the article over the surface of the rollers onto the main conveyor. This type of transfer arrangement is difficult, time-consuming, and laborious.

In an arrangement of the above type, the main endless conveyor usually must be stopped and the operator must leave other duties to complete the transition of the article from the side conveyor onto the main conveyor belt. Also, if the article being transferred is heavy and cumbersome, the transfer can be injurious to the conveying reach or upper surface of the main conveyor belt because it is pushed over it as it passes from one conveyor to the other.

With known conveying systems as above described, the requirement of an operator to manually complete the transfer of the article between the conveyor assembly prevents the installation of a completely automatic integrated conveying system to move articles in several directions.

In operations using article packaging, bundling, and/or strapping machinery, there is usually a series of work stations positioned along and in the proximity of a main endless conveyor system. An expensive and complicated packaging machine is located at the end of the main conveyor, which serves to bind and strap the articles organized at the work stations and fed from the side conveyors. It is desirable to efficiently and continuously feed the articles from the side work stations onto the main conveyor assembly for movement therefrom to the bundling and strapping machinery without interruption to the flow of packages and the needless starting and stopping of the main conveyor assembly.

SUMMARY OF THE INVENTION

To briefly summarize the present invention, it broadly comprises an endless main conveyor having a horizontal upper conveying reach with a series of openings interrupting the upper conveying reach or surface. Swingable endless transverse conveyors are pivotally supported on a main frame along one side of an endless main conveyor assembly. The opposite ends of the swingable transverse conveyors are positioned within the openings in the main elongate endless conveyor and so constructed that the upper conveying reach of the transverse side conveyors is movable above and below the upper conveying reach of the main endless conveyor. The movement above and below the respective conveying reaches is under the influence of a power lift, Suitable drive means are provided to the various endless conveyors.

Accordingly, it is a feature of the present invention to provide a simple and inexpensive system of intersecting endless conveyors to form a system in which articles are conveyed from adjacent work stations and efficiently transferred to a main conveyor without complication and unnecessary interruption of material flow.

Additionally, the invention provides an inexpensive construction of a swingable endless transfer conveyor structure that can be fabricated from conventional hardware and embodied in known conveyor systems without complication.

BRIEF DESCRIPTION OF THE DRAWINGS

The various objects and advantages of the present invention will be apparent by referring to the following description taken in conjunction with the accompanying drawings in which:

FIG. 2 is a sectional view of the conveyor system taken on lines 2—2 of FIG. 1 and showing the construction of the swingable transfer conveyor;

FIG. 3 is a side elevational view of a portion of a conveyor system taken on lines 3—3 of FIG. 1; and FIG. 4 is a sectional view of the conveyor system taken on lines 4—4 of FIG. 1 and showing the power lift device for operating the swingable transfer conveyor.

DESCRIPTION OF THE PREFERRED EMBODIMENT

Figure 1:
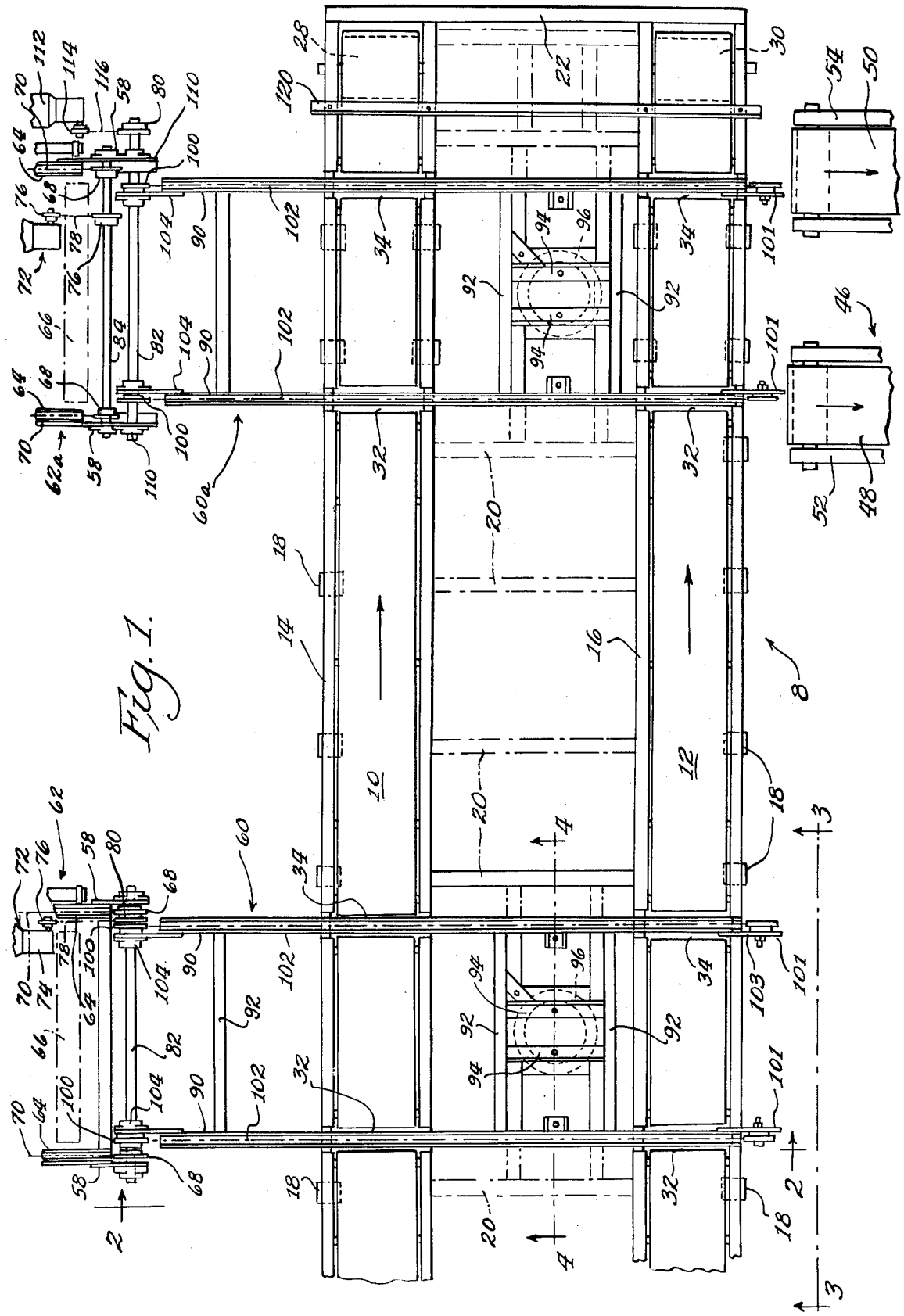
FIG. 1 is a plan view of the conveyor system according to an embodiment of the present invention.

Referring to FIG. 1 of the drawings, an elongated main conveyor assembly 8 comprises a pair of endless parallel belts 10 and 12 supported on parallel conveyor frame structures 14 and 16. The frame structures 14 and 16 are horizontally supported by a plurality of upright leg members 18 and interconnected by a series of transverse frame members 20 and an end frame member 22. The endless belts 10 and 12 are rotatably supported on a series of parallel idler rollers 24 and 26 (FIG. 3) and on main pulleys or roller 28 and 30. Conventional drive means for the rollers, such as a drive motor, is not shown because it is not part of the present invention and can be of any suitable construction. The direction of travel of the endless belts 10 and 12 are indicated by arrows as shown in FIG. 1.

FIG. 3 illustrates a portion of the main conveyor assembly 8 and includes a pair of openings or upwardly extending slots in the frame structures 14 and 16. These slots 32 and 34 are defined by spaced apart upwardly extending frame elements 36 and 38 and a horizontally extending frame element 40. A pair of the idler rollers 26 for each of the endless belts are supported on bracket 42 adjacent slots 32 and 34 and are secured to upright leg members 18. The endless belts 10 and 12 are trained about the idler pulleys 24 and 26 and thereby allowing one continuous belt to be utilized around the entire conveyor structure and circumvent the upwardly extending openings or slots 32 and 34.

The return reach of the belts 10 and 12 is supported and guided by a series of transversely extending roller 24 rotatably supported on depending brackets 44 secured to the conveyor frame structures 14 and 16.

While endless belts have been shown, the present invention would work equally as well by replacing the single continuous belts 10 or 12 by a series of aligned driven belts in which openings 32 and 34 are defined between the ends of such belt structures.

FIG. 1 of the drawings also shows a transverse driven belt conveyor assembly 46 comprising a pair of belts 48 and 50 supported by parallel frame structures 52 and 54. The direction of travel of such conveyor belts is indicated by arrows thereon and the conveyor is driven by a drive motor in a conventional manner and supported by conventionally arranged drive and driven pulleys.

Referring now to FIGS. 1, 2 and 4, there is shown a pair of swingable mounted transfer conveyors 60 and 60a pivotally supported on a main frame and conveyor arrangement 62 and 62a. Since the two main frame and conveyor arrangements are substantially identical, only one set will be described. The main frame and conveyor arrangement 62, shown in FIG. 1, includes a horizontal conveyor assembly comprising frame members 64 and 66, sprockets 68, conveyor chains 70, and a drive means 72. This arrangement can be of any conventional design and the conveyor chains 70 could be replaced by well known belt conveyors or the like.

In the conveyor arrangement forming part of the main frame 62, the motor or drive means 72 comprise an electric motor and gear device 74 and sprockets 76. A drive chain 78 is trained around sprockets 76 and another sprocket 80 which is secured to a transverse shaft 82 which also supports conveyor sprockets 68.

The main frame and conveyor assembly 62a also includes a motor or drive means 72 having comparable motor and gear drive 74, a pair of sprockets 76, one secured to a transverse shaft 84, and a drive chain 78 trained thereabout. The transverse shaft 84 also supports conveyor sprockets 68, in a similar arrangment as found in main frame and conveyor assembly 62. The transverse shafts 82 and 84 are supported, respectively, on the main frame conveyor assemblies 62 and 62a by bearing means 58 which are secured to the frame members 64.

As previously mentioned, the conveyors on the main frame 62 and 62a could be replaced by an endless belt conveyor or other suitable means such as an intermittently driven reciprocating conveyor or the like. The only requirement is a suitable conveyor means to move an article positioned on the main frame conveyor to the swingable transfer conveyors 60 and 60a and therefore such alternate structures would fall within the scope of the present invention.

The swingable transfer conveyors 60 and 60a are substantially the same in construction and comprise a pair of spaced apart side frame members 90 and a series of transverse frame members 92 secured at their opposite ends to the side frame members 90 to form a unitary conveyor frame. Additional frame members 94 are secured to the frame members 92 and form a connection for a pneumatic power lift device 96, which is provided to raise and lower the swingable transfer conveyor assemblies 60 and 60a as will hereinafter be described. A pair of limit chains 98 are provided for each of the pneumatic power lift device 96 and are connected between the transverse frame members 20 and the frame members or means 94 to limit the height that the conveyor assemblies 60 and 60a may be raised in relation to the main conveyor assembly 8. This type of pneumatic lift device is of conventional design and may be replaced by various other types of suitable devices, such as hydraulic cylinders or the like.

Located adjacent opposite ends of each of the side frame members 90 are sprockets 100 and 101. Trained about these sprockets 100 and 101 are endless chain conveyors 102 which are arranged in substantial parallelism with the side frame members 90. The ends of the swingable conveyors 60 and 60a adjacent the main frame and conveyor assemblies 62 and 62a are pivotally supported on bearing means 104. This is accomplished by the shaft 82, described above, supported on the bearing blocks 58 of the main frame which rotatably support the bearing means 104. The shaft 82 on each of the conveyors thus serves as a pivot axis for the transverse conveyor assemblies 60 and 60a to swing thereabout under the influence of power lift means 96, as it extends and retracts. The shaft 82 also serves as a common drive shaft for the chain conveyor arrangements on each of the side frames 102.

As previously mentioned, the conveyors 60 and 60a are provided with sprockets 100 and 101 at each end thereof. The sprockets 101 are directly connected to the outer ends of the side frame members 90 by bracket means 103 while the sprockets 100 are secured to the transverse shaft 82 adjacent the bearing means 104 in alignment with sprockets 101 with the conveyor chains 102 trained thereabout. Accordingly, as the motor and gear device 72, for example of conveyor 60, turns the transverse shaft 82 the conveyor chains 70 will move in response thereto as well as the conveyor chains 102.

Conveyor 60a has a slightly different drive arrangement. The motor 72 of the gear drive and its gear drive arrangement 74 with its sprockets 76 and connecting drive chains 78 operate a shaft 84 to operate the chain conveyor 70 of the assembly 62a. A second transverse shaft 82 is supported on the main frame by bearing means 110 and driven from a similar drive motor and gear arrangement 112 by sprockets 80 and 114 and a drive chain 116 trained thereabout. Sprockets 100 are secured to the shafts 82 adjacent bearing means 104. Thus, shaft 82 serves the same function as shaft 82 of transverse conveyor 60 in that it provides a common drive means for the conveyor chains 102 as well as a pivot axis for the movement of the conveyor 60a under the influence of power lift means 96.

Located at the end of the main elongated endless conveyor 8 is a transverse stop or limit member 120 which is secured to the main conveyor frames 14 and 16 to limit the movement of articles and to assist in orienting the articles in relations to the transfer conveyor 60a. By this means, the transition of the articles from the main conveyor 8 on to the transverse conveyor assembly 46 is efficiently accomplished.

OPERATION OF THE PREFERRED EMBODIMENT

The article conveying system hereinbefore described operates as set forth below. The use of this system as illustrated and described in the present embodiment is for packaging and strapping articles to the well known wooden pallet (not shown) which are constructed of a wooden platform secured to a pair of runners which support the platform. The pallets are placed on the main frame and conveyor assemblies 62 and 62a with the runners transversely disposed with respect to the upper conveying reach of the conveying chains 70. Organized on the pallets are a multiplicity of items which comprise the article which is to be conveyed, bound and strapped. When each such article is transferred from the main frame conveyors and moved to the conveyor 46 it will be moved to the final work station where strapping and bundling machines will securely bind all the items to the pallet to securely package the article.

As the article reaches the main frame conveying chains 70 and all the items have been organized on the pallet the article will be moved forwardly as the main frame conveyors 70 are operated by the drive means 72. It will be conveyed to a point where it will be moved onto the upper conveying reach of the transfer conveyor chains 102. As it progresses along the upper conveying reach of the endless transfer conveyor on the upper surface of chain 102, the power lift device 96 will be actuated to swing the transfer conveyor assembly 60 upwardly whereby the upper conveying reach of the endless chain 102 will be positioned above the upper conveying surface of the endless belts 10 and 12.

Then the article is then moved upwardly by the conveying chains 102 above the upper conveying reach of the belt conveyors 10 and 12 until the runners on the pallet are in alignment with and above the upper surface of conveying belts 10 and 12. At this point, the transfer conveyor lift device 96 is lowered to position the transfer conveyor assembly 60 at a level below the upper conveying reach of the endless belts 10 and 12 and the runners on the pallet would be, at that time, positioned on the moving surface of the belts 10 and 12. It should be understood that this position is shown in full lines in FIG. 2 and the raised position of the assembly 60 is shown in dot-dash lines in FIG. 2.

When the pallet runners touch the upper surface of the article conveying assembly, the article will be transferred onto the main conveyor and will be moved to the next transition point to be passed in a similar process by transfer conveyor 60a onto the conveying assembly 46.

An article moving from the main frame conveyor arrangement 62 as previously described will be moved in this manner until it reaches the stop or limit member 120. At this point the transfer conveyor 60a will be elevated above the belt surfaces the upper surfaces of the belts 10 and 12 and the pallet runner will engage the conveying reach of chains 102 and therefrom will be transferred in a like manner to the upper conveying surfaces of the belts 48 and 50, as the article is then moved to the strapping machine assembly (not shown) for the final packaging operation.

An article which is organized and positioned on the main frame and conveyor assembly 62a will be positioned on its conveyor chains 70 in like manner and will move forward directly onto the transfer conveyor 60a and ride on the upper surfaces of the conveying chains 102 and will be directly transferred onto the conveyors 48 and 50.

As previously mentioned, a plurality of transfer conveyors 60 can be positioned along the main conveyor assembly 8 and in like manner continuously feed assembled articles onto the main conveyor belt. In such a system, a single main conveyor assembly 8 can service a multiplicity of side assembly and work stations and at spaced intervals feed assembled articles onto the main conveyor belt and into a single binding and strapping machine thereby maximizing the use of an expensive and complicated machine.

There are various alternate embodiments which fall within the scope of this system. For example, the conveyor 46 could be eliminated and the main conveyor assembly 8 could be extended with the strapping and binding machine positioned directly at its end. Also, if articles other than runner pallets were being processed or various types of packages were being processed, the parallel conveyor belts 10 and 12 could be replaced by a single conveyor belt. Furthermore, it is within the scope of this invention to replace the endless flexible belts 10 and 12 with chain conveyors of the type utilized on the transverse side conveyors.

Various types of electrical circuits and positioning pressure-sensitive switches could be utilized within this system to position and control the spacing between articles as they are fed from the side conveyors onto the main conveyor assembly 8 and therefore onto the final work stations conveyor assembly 46 to the next step in the processing.

Furthermore, it is within the scope of this invention to continuously feed all of the conveyors or intermittently run all of the conveyors depending on the speed and processing of articles and the nature of the work being performed at each of the various work stations.

Accordingly, by providing the unique construction of the swingable transfer conveyor assemblies 60 and 60a and utilizing this unique structure in combination with the main conveyor assembly 8 and its particular interrupted upper conveying surfaces which are defined by openings 32 and 34, there is provided a simple, inexpensive and efficient conveying system that can be arranged to transfer articles from a multiplicity of work stations and transfer them in a multiplicity of directions without manual labor and time-consuming starting and stopping of the entire conveying system.

What is claimed is:

1. An article conveying system comprising in combination an elongated conveyor assembly having parallel spaced apart endless belt conveyors; drive means connected to the belt conveyors; support means for said belt conveyors, said support means having spaced openings defining upwardly directed slots; idler rollers on said support means adjacent the upwardly directed slots with said endless belt trained about said rollers to locate an upper horizontal conveying reach below said slot; a swingable transverse conveyor assembly including frame means having spaced apart side frame members, one end of the spaced apart side frame members pivotally mounted on a main frame, the opposite ends of the spaced apart side frame members positionable within the slots in the elongated main conveyor and movable vertically relative thereto; power lift means connected to the transverse conveyor assembly to swing the opposite end of said conveyor relative to the slots in the elongated conveyor assembly support means; sprocket means supported on the transverse conveyor assembly and in alignment with the side frames, endless chain conveyors trained about the sprocket means, common drive means connected to the endless chain conveyors, said chain conveyors having an upper conveying reach positionable above and below the upper conveying reach of the elongated belt conveyor; a third endless conveyor supported on the main frame and having an upper conveying reach in alignment with and in operative association with said chain conveyors adjacent the pivotal mounting of the transverse conveyor assembly to the main frame; and drive means coupled to the third conveyor; whereby an article positioned on the third endless conveyor may be moved to the upper conveying surface of the chain conveyors on the transverse conveyor and may be moved therefrom and elevated by said power lift means above the elongated belt conveyors and conveyed over the top of the elongated belt conveyor upper reach and the transverse conveyor assembly may then be lowered by said power lift means to deposit the article on the upper conveying reach of the elongated conveyor assembly belts.

2. An article conveyor system comprising:
a main frame having a main frame conveyor means;
a swingable endless conveyor means the upstream end of which is pivotally connected to said main frame adjacent the downstream end of said main frame conveyor means to receive articles therefrom and comprising a pair of spaced apart side frames, frame means interconnecting said frames, sprockets supported adjacent opposite ends of each of said side frame members, an endless conveyor trained about the pair of sprockets on each of said side frames, and common drive means connected to said conveyor;
means connected to said swingable conveyor means to pivotally oscillate the downstream end of said swingable conveyor means about the pivotal connection to said main frame;
an endless main conveyor transverse said swingable conveyor means, said main conveyor having an endless belt conveyor forming a horizontal upper conveying surface transverse to said first endless conveyor, drive means connected to said conveyor; support means for said conveyor; said support means having a spaced opening defining at least one pair of upwardly directed slots; idler rollers on said support means adjacent the upwardly directed slots with said endless conveyor trained about said rollers to locate an upper horizontal conveying reach below said slots; said horizontal upper conveying surface presented on either side of said slots and eccentrically thereof, thus forming an eccentrically horizontal upper surface, said slots permitting pivotal oscillation of said downstream end of said swingable conveyor means between positions above and below said main conveyor, the downstream end of said swingable endless conveyor means extending through at least one pair of said slots and substantially across said main conveyor, said main conveyor thereby receiving one article from said swingable conveyor as said swingable conveyor passes from above to below said main conveyor.

3. The apparatus defined in claim 2, in which said common drive means is a transverse shaft interconnecting the sprockets adjacent one end of the side frames and a motor coupled to the shaft to operate the endless conveyors for synchronized movement.

4. The apparatus defined in claim 3, and further including bearing means secured to the main frame for supporting said shaft, said transverse shaft serving as a pivot axis for said swingable conveyor.

5. The apparatus defined in claim 4, in which the swingable endless conveyor means are a pair of endless chain conveyors.

6. The apparatus defined in claim 5, in which said frame means interconnecting said side frames comprises transverse frame members secured at their opposite end portions to said side frames and providing a connection with said pivotal oscillation means, and in which said pivotal oscillation means is disposed intermediate the ends of said side frame members and spaced from said pivot axis.

7. An article conveying system comprising in combination an elongated conveyor assembly having an endless belt forming a horizontal upper conveying surface, said upper conveying surface having at least one pair of spaced openings defined along the upper conveying surface, said openings being located intermediate opposite ends of said surface, said horizontal upper conveying surface running on either side of said pair of openings and centrally thereof, thus forming an essentially continuous horizontal upper surface in a first direction; a swingable transverse conveyor assembly having an upper conveying surface formed by a pair of spaced endless conveyors; drive means connected to the transverse conveyor for driving the upper conveying surface thereof in a direction angularly related to the direction of travel of said elongated conveyor assembly, said pair of spaced endless conveyors positioned in said pair of spaced openings at said one end of said transverse conveyor said one end of said transverse conveyor movable between positions to locate the upper conveying surface of said end of said transverse conveyor above and below the upper conveying surface of the elongated conveyor assembly; pivot means supporting the opposite end of said transverse conveyor; and power lift means connected to the swingable transverse conveyor whereby the upper conveying surface of the driven transverse conveyor can be positioned above and below the upper conveying surface of the elongated conveyor so that an article conveyed along the transverse conveyor upper conveying surface can be elevated above the upper conveying surface of the elongated conveyor and the transverse conveyor can be lowered below the upper conveying surface of the elongated conveyor thereby depositing the article on the elongated conveyor assembly for movement thereon in a direction different from the direction of the transverse conveyor conveying surface.

8. The combination defined in claim 7, in which the endless elongated conveying means includes a flexible belt and the transverse endless conveyor means is an endless chain conveyor.

9. The apparatus defined in claim 8, in which the transverse conveyor assembly includes spaced apart endless conveyors having end portions positionable in said openings, said endless conveyors spaning the width of said flexible belt.

10. The apparatus defined in claim 7, further including a main frame having endless conveyor means in alignment with and having one end positioned adjacent the upper conveying surface of the transverse swingable conveyor assembly adjacent the pivot means, drive means for said main frame endless conveyor means.

* * * * *